United States Patent [19]

Repperger

[11] Patent Number: 4,477,043

[45] Date of Patent: Oct. 16, 1984

[54] BIODYNAMIC RESISTANT CONTROL STICK

[75] Inventor: Daniel W. Repperger, Vandalia, Ohio

[73] Assignee: The United States of America as represented by the Secretary of the Air Force, Washington, D.C.

[21] Appl. No.: 449,922

[22] Filed: Dec. 15, 1982

[51] Int. Cl.³ .................. B64C 13/04; B64C 13/46
[52] U.S. Cl. .................................. 244/223; 244/230; 244/178
[58] Field of Search .............. 244/223, 221, 226, 227, 244/228, 230, 178, 195, 196, 75 R

[56] References Cited

U.S. PATENT DOCUMENTS

| 2,944,770 | 7/1960 | Patin et al. | 244/223 |
| 3,002,714 | 10/1961 | Decker | 244/223 |
| 3,588,007 | 6/1971 | Naumann | 244/7 |
| 3,773,282 | 11/1973 | Sands et al. | 244/83 R |
| 3,862,730 | 1/1975 | Heiney | 244/223 |
| 4,071,209 | 1/1978 | Hart | 244/83 D |
| 4,236,685 | 12/1980 | Kissel | 244/223 |

FOREIGN PATENT DOCUMENTS 735514  8/1955  United Kingdom ............... 244/223

*Primary Examiner*—Galen L. Barefoot
*Attorney, Agent, or Firm*—Donald J. Singer; John R. Flanagan

[57] ABSTRACT

An improvement to an aircraft control stick is disclosed. Movement of an aircraft may generate a force which undesirably causes the aircraft pilot to deflect the aircraft's control stick, which thereby results in the aircraft deviating from the desired flight path. The present invention includes a processor-based system which employs an algorithm that generates a signal for causing the control stick to resist such forces. The invention includes a spring and damper connected to the control stick so that the spring constant and damping ratio may be varied.

5 Claims, 9 Drawing Figures

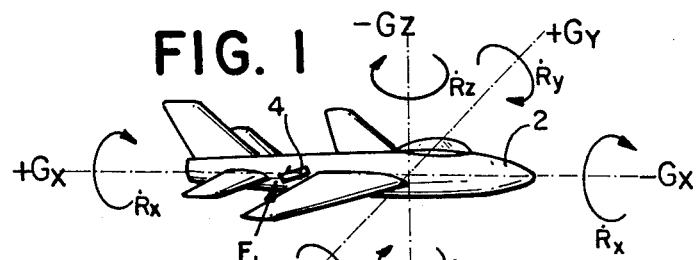
FIG. 1
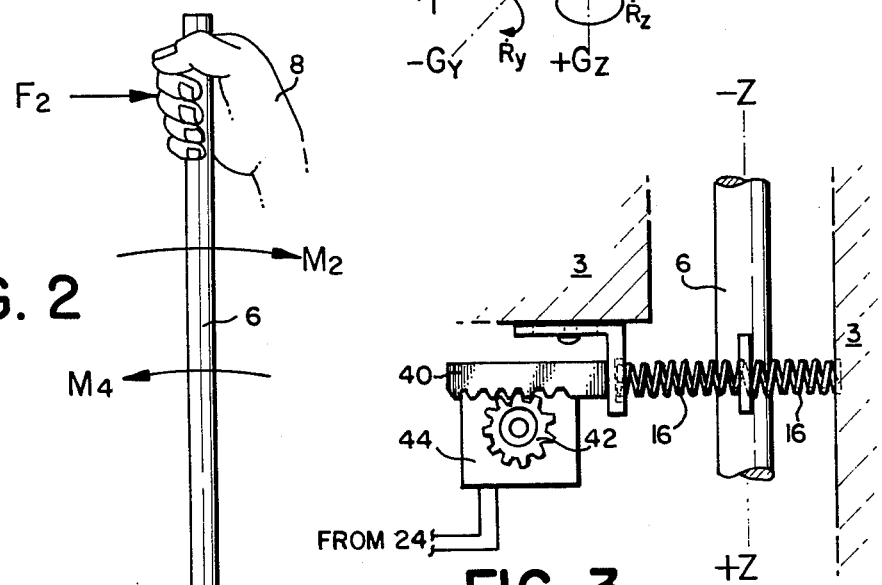
FIG. 2
FIG. 3
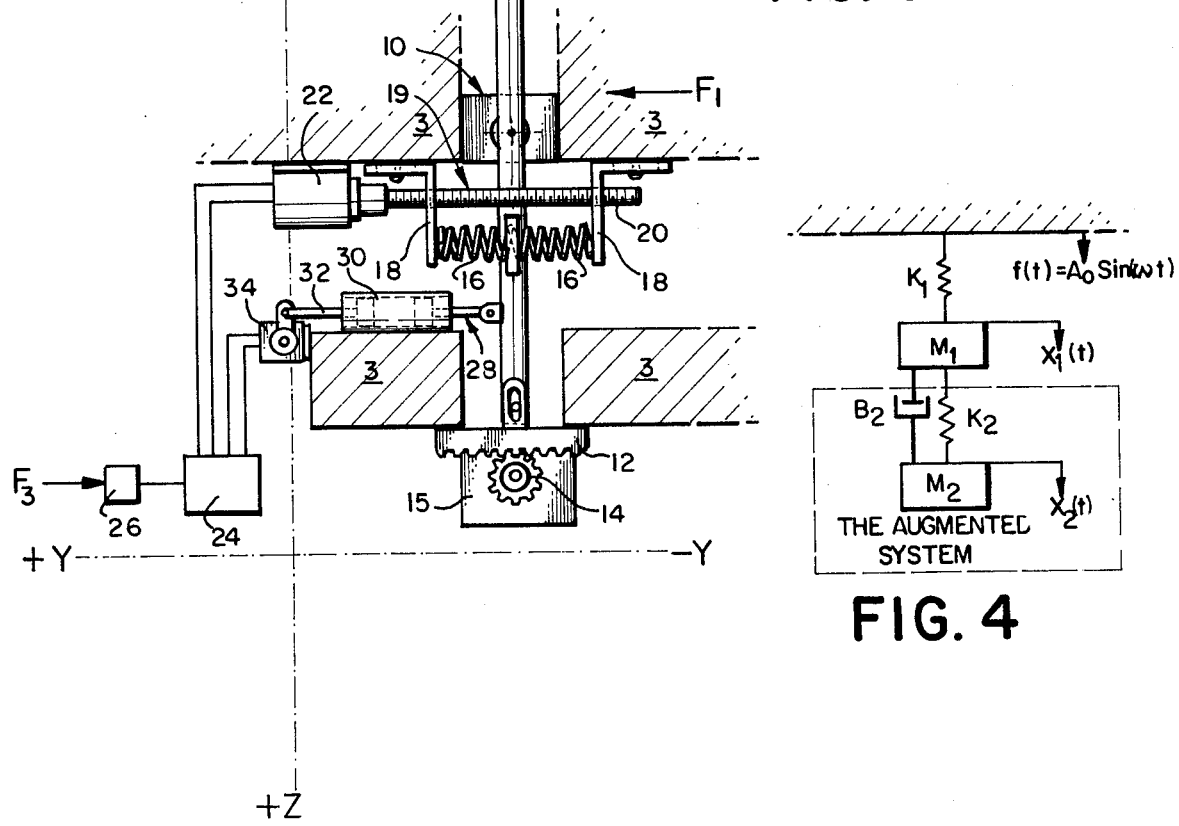
FIG. 4

BIODYNAMIC RESISTANT CONTROL STICK

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

This invention generally relates to aircraft control systems, and in particular to pilot operable members of such control systems.

2. Description of the Prior Art

It is well recognized that aircraft control systems have become increasingly complex. This complexity is due to the requirement that aircraft, particularly tactical military aircraft, perform over a wide speed regime. Control system complexity has also increased due to a requirement for redundancy with so called "fly by wire systems" wherein there is no direct mechanical linkage between the pilot operated control member and the aircraft control surfaces.

Such control systems have included means for varying the force required to move the pilot operated member in response to the forces acting on the aircraft or the speed of the aircraft. Such force varying components and dampers have been connected in series between the pilot operated control member and the aircraft control surfaces so as to increase aircraft stability.

Additionally, high speed tactical aircraft tend to become unstable during certain speed regimes. In such cases, electronic stability augmentation systems are added to the aircraft control system so as to provide the requisite degree of inherent stability. Pilot induced oscillations, which tend to occur during certain speed regimes, are routinely compensated for by such stability augmentation systems. The electronic stability augmentation systems of the prior art are placed in series between the pilot operable member or control stick and the aircraft control surfaces.

It has long been recognized that movement of an aircraft may inadvertantly cause the pilot to move the control stick, thereby causing the aircraft to deviate, at least momentarily, from its desired flight path. A well known example of this "biodynamic feedthrough" occurs when an aircraft encounters turbulent air. The aircraft may be caused to pitch suddenly thereby causing the pilot to either pull or push the control stick. This biodynamic action causes further pitch excursions of the aircraft. Although this biodynamic feedthrough has been a problem to varying degrees, it has generally been handled by recognition of the problem by the aircraft pilot and the resulting appropriate pilot training. However, with advancing aircraft technology, such inadvertent deviations from the aircraft's desired flight path have become unacceptable.

For example, certain high technology, military tactical aircraft are now equipped with fuselage mounted deflectors which, when extended on one side of the aircraft, cause lateral movement of the aircraft in the opposite direction. Such lateral accelerations inadvertantly cause the pilot to laterally move the aircraft's control stick, thereby causing the aircraft to undesirably roll or rotate about its longitudinal axis.

SUMMARY OF THE INVENTION

It is therefore an object of the present invention to provide a means for preventing intentional movement of an aircraft in one mode to unintentionally cause movement of the aircraft in another mode.

It is another object of the present invention to provide a means for causing an aircraft pilot operated member to resist movement thereof caused by the pilot due to movement of the aircraft.

According to the present invention, a means is provided for resisting biodynamic feedthrough. A spring is connected at its midpoint to the aircraft control stick. An actuator is connected to the opposite ends of the spring so as to compress it. The spring resists movement of the stick from a neutral position, at all times. A force sensor is provided which senses lateral movement of the aircraft and generates a signal which causes the actuator to compress the spring. Thus, the force required to move the stick, from its neutral position, is increased so as to reduce the amount of biodynamic feedthrough induced by the lateral movement of the aircraft.

In another embodiment of the invention, a force is applied to the control stick so as to counter the biodynamic feedthrough. This may be accomplished by a spring having one end connected to the actuator and its opposite end connected to the control stick, so that movement of the actuator exerts a force counter to the biodynamically induced force. The same result may be achieved by a spring connected to the control stick at its midpoint, having one end connected to the actuator and its other end connected to the aircraft frame.

Under certain circumstances, a damper may be desired. In such circumstances, the force sensor would provide a signal to a damping device connected to the stick and to the aircraft frame, so as to vary the degree of damping in accordance with lateral acceleration of the aircraft.

The objective of both embodiments of the invention is to resist the biodynamically induced force exerted by the pilot on the control stick. The force or acceleration sensor provides an input signal which varies directly with the lateral acceleration of the aircraft. This signal is processed by a processing means which generates a processed signal which causes the actuator to provide the appropriate degree of resistance. The correlation between lateral acceleration and the degree of resistance required at the control stick may be determined experimentally or from a variety of algorithms which vary depending upon the particular application of the device. The processor generates a process signal in accordance with that correlating information, and may take the form of an analog circuit or a microprocessor.

BRIEF DESCRIPTION OF THE DRAWINGS

The construction of the preferred embodiment, as well as further objects and advantages of the invention, will become apparent from the following specification when considered with the accompanying drawings in which like numerals refer to like parts wherein:

FIG. 1 shows, schematically, an aircraft.

FIG. 2 schematically shows an aircraft control stick incorporating the present invention.

FIG. 3 schematically shows an alternative embodiment of a portion of the aircraft control stick assembly of the present invention.

FIG. 4 schematically shows an analogy of the human body and control stick.

DESCRIPTION OF THE PREFERRED EMBODIMENT

Figure 5:
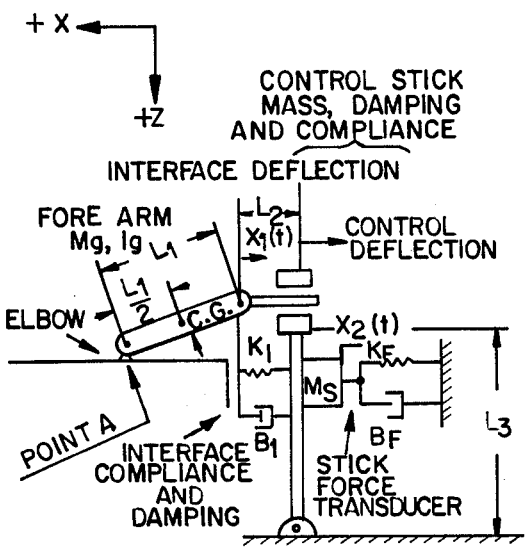
FIG. 5 schematically shows a side view of an aircraft control stick and human arm.

FIG. 1 shows an airplane 2 and its three orthogonal axes. The generally recognized sign convention is used. The airplane 2 is shown with an outwardly deflectable canard 4. The canard 4 is normally flush with the aircraft's fuselage. The canard is pivotally mounted at its leading edge so that it may be deflected outward. When the canard 4 is deflected, a sideward force $F_1$ is aerodynamically generated which causes the aircraft to accelerate and move laterally. FIG. 1 shows such a canard on the right side of the aircraft, such that when it is deflected, the aircraft is caused to move laterally to the left.

The canard 4 is extended by an actuator, not shown. Such canards are typically mounted on both sides of the aircraft and are positioned so that the lateral force $F_1$ acts at the aircraft's center of gravity. Two canards may be used on each side of the aircraft, in which case they are positioned so that their combined effect is to produce the force $F_1$ so that it acts at the aircraft's center of gravity. Such devices enable military aircraft to quickly engage in evasive manuevers. The canards on each side of the aircraft may be operated simultaneously so as to act as speed brakes. In such a case, the two laterally directed forces which are generated by the respective pair of canards cancel one another and no lateral movement of the aircraft occurs.

Sudden accelerations of an aircraft result in an opposite, but equal reaction, on persons and objects within the aircraft. For example, in the example shown in FIG. 1 the aircraft is thrust in the positive y direction, or to the left, when the canard 4 on the right side of the aircraft is deflected. This causes the pilot to be forced to the right side of the aircraft.

Reference will now be made to FIG. 2 where a rear view of a schematic of an aircraft control stick assembly is shown. A control stick 6 is shown being gripped by a pilot's right hand 8. The control stick assembly which is schematically shown is of the type known as a side arm controller, and is shown applied to a fly by wire system. Typically, such a side arm controller is a stick which is mounted on the right side of the pilot. Movement of the stick 6 causes a signal to be sent to electrical actuators which operate the aircraft's control surfaces. Such actuators may be electrical or hydraulic, and the signal which is generated by movement of the control stick may be electrical or hydraulic. For purposes of explanation, the control stick 6 is pivotally mounted to the aircraft frame 3 by a ball and socket assembly 10 which permits lateral and longitudinal motion of the stick 6 about its pivot point. Typically, lateral movement of such a control stick causes the aircraft to rotate about its longitudinal or x axis through the deflection of ailerons or spoilers. Longitudinal movement of the stick typically causes rotation of the aircraft about its pitch or y axis through deflection of its elevators.

As may be seen in FIG. 2, lateral movement of the stick 6, along the y axis, causes the stick to be pivoted about its ball and socket so that a rack 12 causes rotation of a gear 14 which is connected to a potentiometer 15, thereby generating a signal which is used to operate the actuators which control the aircraft's ailerons or spoilers so as to cause the aircraft to rotate about its roll or x axis.

When the canard 4 is caused to deflect by the pilot, by means not shown, the force $F_1$ is generated on the aircraft which causes the aircraft to accelerate laterally in the positive y direction. The pilot's right arm and hand 8 is thereby acted upon by a force $F_2$ and generates a moment $M_2$, which tends to move the stick to the right, thereby causing the aircraft to roll to the right, or in the negative $R_x$ direction. This action is commonly referred to as biodynamic feedthrough, and is undesirable in that the pilot's objective in deflecting the right canard was to move the aircraft to the left. The pilot did not intend the aircraft to roll to the right, but was caused to induce the right hand roll due to the force field which was generated by the lateral acceleration of the aircraft to the left.

An apparatus embodying the principles of the present invention and used to counter the effects of $F_2$ will now be described. A spring 16 is shown connected at its midpoint to the control stick 6 below the ball and socket 10. The opposite ends of the spring 16 are connected to the arms 18 of a turn buckle 19. A screw 20 of the turn buckle 19 is caused to rotate by a motor 22 connected to the aircraft frame 3. Thus, rotation of the motor will cause the spring to be compressed or stretched, thus varying the spring constant so as to vary resistance of the control stick 6 to movement from a neutral position. The spring 16 may be nonlinear (have a different number of turns per inch) to achieve this effect. The motor 22 rotates in response to a signal received from a processor 24. The processor 24 transmits the signal to the motor based upon a signal it receives from an accelerometer 26.

In operation, deflection of the canard 4 produces a force $F_1$ which moves the aircraft to the left, in the $+y$ direction. This, in turn, causes the pilot to unintentionally exert a force $F_2$ on the control stick 6. Additionally, $F_1$ induces a force $F_3$ to act on the accelerometer 26 which transmits a signal to the processor 24 which, in turn, sends a signal to the motor 22 which causes the screw 20 to rotate, thereby drawing arms 18 toward each other. The drawing together of the arms compress the spring 16, increasing its spring constant $K_s$, making it more difficult to move the stick from its neutral position. Movement of the stick is resisted by a force $F_4$, not shown, which generates a moment $M_4$ which resists the biodynamic moment $M_2$. The force $F_4$ acts at the point at which the spring 16 is connected to the stick. The actual magnitude of $F_4$ should be such that the restoring moment $M_4$ is substantially equal to the biodynamic moment $M_2$. In the present system, $F_2$, and, hence, the biodynamic moment $M_2$ tending to rotate the stick, is a direct function of $F_1$. The force $F_3$, which acts on the accelerometer, is also a direct function of $F_1$. The objective is to use the signal generated by the accelerometer 26 to appropriately compress the spring 16 so that the force $F_4$, and, hence, the restoring moment $M_4$, is substantially equal to the biodynamically induced moment $M_2$. It is the function of the processor 24 to produce a process signal in response to the signal received from the accelerometer 26, which will produce the appropriate degree of compression of the spring 16 so as to generate the proper restoring moment $M_4$.

In general, for small deflections of the control stick, in the example described, there is a linear relationship between $M_4$ and $M_2$. Accordingly, with appropriate calibrations, the processor 24 could take the form of a simple analog electrical circuit. However, for large deflections of the control stick, the relationship between $M_2$ and $M_4$ becomes non-linear. If the degree of non-linearity is unacceptable, a more complicated circuit could be substituted. Such electrical circuit may include a voltage divider or wheatstone bridge.

A statistical or empirical data base may also be obtained, by testing, to determine the performance characteristics of the processor 24. Once such a experimental data base has been obtained, it may be incorporated either in an appropriate analog electrical circuit, or in a microprocessor which would extrapolate between the experimentally determined data points.

A preferred approach for determining the performance characteristics for the processor 24 is to calculate the desired characteristics and program an equation, or an algorithm based upon the equation in a microprocessor. An example of such an equation and algorithm is set forth in an appendix to this patent application.

The particular processor, i.e., electrical analog circuit, microprocessor, or other device, as well as the performance characteristics of the processor 24, will vary depending upon the particular application of the invention and various other design criteria. The processor 24 may also have adjustment means to take into account various other factors. Such other factors would include pilots having arms of varying masses, which would result in a change in $F_2$ for a particularly $F_1$. Another factor which would lend itself to an adjustment would be aircraft control sticks which have adjustable lengths. In the side arm controller, used for the application described in the present case and in the algorithm set forth in the attachment, it was assumed that the pilot's elbow was fixed and that the pivoting motions of the hand and control stick would take place about a pivot point located at the elbow. The relationship of $F_2$ to $F_1$, and, hence, the relationship between $M_4$ and $F_1$ change considerably if the pilot's elbow is not fixed. This change would also have to be taken into account in the performance characteristics of the processor 24.

Another embodiment of the invention is shown in FIG. 3. In this embodiment, the spring 16 is connected at its midpoint to the control stick 6. One end of the spring 16 is connected to the aircraft frame 3, while the other end is connected to a rod 40 which is caused to move parallel to the spring center line by a gear 42 which is driven by a motor or actuator 44. The motor 44 rotates in response to a voltage signal proportional to the desired change in the spring constant received from processor 24. In this embodiment of the invention, only one end of the spring is moved by the motor 44. Thus, compression of the spring, in addition to changing the spring constant, exerts a restoring force and, hence, restoring moment on the control stick 6, without deflection of the stick by the biodynamically induced force $F_2$. By eliminating that portion of the spring between the control stick and the aircraft, a restoring force $F_4$ and restoring moment $M_4$ may also be applied to the control stick. This method of opposing the biodynamically induced force $F_2$ may be desirable under certain circumstances and for certain applications.

In the application of the invention described herein, it was found that little or no damping of the stick was required due to the biodynamic input $F_2$. However, there are certain circumstances under which damping may be desirable. In such an event a damping device may be provided as shown in FIG. 2. A link and piston 28 is slidably connected to a cylinder 30. A second link and piston 32 is also slidably connected to the cylinder 30. The cylinder contains a compressible fluid. The link 32 is connected to a motor 34 which receives a signal from the processor 24. Accordingly, movement of the link 32 varies the pressure of the fluid within the cylinder 30, thereby varying the damping characteristics or the damping constant $B_s$ between the control stick 6 and the aircraft frame 3.

The present invention has been applied and described with reference to a coupling of aircraft roll to aircraft side force. It will be apparent to those skilled in the art that the present invention may be applied to any one of a number of similar aircraft parameters. For example, turbulence frequently cause aircraft to pitch about its pitch or y axis, thereby causing the pilot to move longitudinally in a direction parallel to the aircraft's roll axis. Such motions result in a biodynamic input to the control stick, which cause the aircraft to further pitch about its roll or y axis. The present invention may be adapted so as to sense aircraft motion along the x axis and apply a restoring moment to the aircraft control stick so as to eliminate or substantially reduce biodynamic input which would cause fore and aft motion of the control stick. The invention has been described with respect to a fly by wire side arm controller. The invention could be equally applied to a conventional mechanical aircraft control stick or yoke which is centrally located with respect to the pilot.

Although the present invention has been described with reference to a particular embodiment herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

APPENDIX

Derivation of A Computer Algorithm for Minimum Biomechanical Feedthrough

Figure 6:
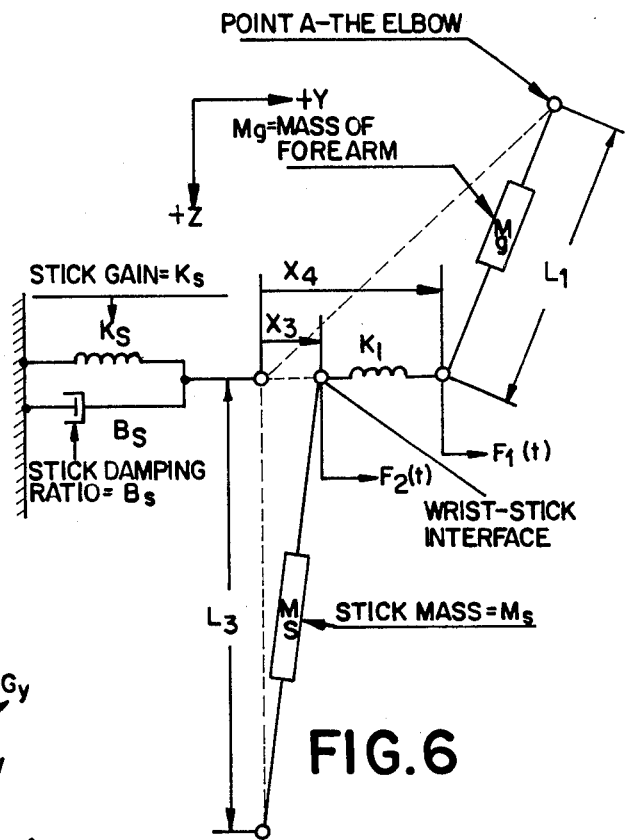
FIG. 6 is a front view of the control stick and arm shown in FIG. 5.
Figure 7:
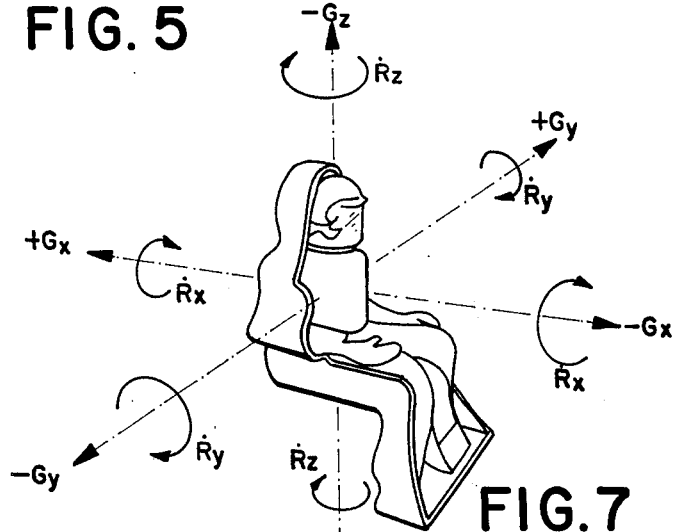
FIG. 7 shows a pilot for the aircraft shown in FIG. 1.

The approach to solving the problem can be schematically represented as shown in FIG. 4 where $M_1$ is the human body and the augmented system shown in the box is the control stick of the present invention. By approximately selecting the spring constant $K_2$, movement of $M_1$ need not result in movement of $M_2$. The sign convention used herein is shown in FIG. 7 with respect to an aircraft pilot who will use a side arm controller. FIG. 5 is a schematic illustration of the pilot's right arm, from the elbow forward, and assumes that the elbow is stationary at point A. The pilot is grasping the side arm controller or control stick. FIG. 6 is a front view of the arm-stick combination shown in FIG. 5.

For illustrative purposes, this appendix will describe the derivation of an algorithm for minimum biomechanical feedthrough. After the algorithm is derived, the microprocessor in the stick controller can change the stick properties (gain $K^*(t)$ and damping ratio $B^*(t)$) so that the total man-machine interaction has minimum biomechanical feedthrough. This choice of the objective function (biomechanical feedthrough) being minimized is somewhat arbitrary. Any other type of function could, alternatively, be minimized. This would produce a different type of dynamic stick which may have application in other situations.

For the minimum feedthrough stick, it can be shown that the configuration shown in FIGS. 5 and 6 produce equations of motion that decouple under small angle assumptions. Since the $G_y$ forces act in only the y-z axis in FIG. 7, the equations of motion are derived here only in this axis. The Lagrangian for motion in the x-y plane can be expressed as:

$$L = \frac{1}{8} M_g \dot{x}^2_4 + \frac{1}{8} M_s \dot{x}^2_3 + \frac{1}{2} K_I(x_4 - x_3)^2 + \frac{1}{2} K_s x_3^2 \quad (1)$$

where an assumption of small angular rotations of stick and arm, respective mass concentration at the mid-length of the stick and arm, and an elastic coupling of magnitude $K_I$ between the hand and stick have been made. The equations of motion are then directively derivable from:

$$\frac{d}{dt} \frac{\partial L}{\partial \dot{q}_i} - \frac{\partial L}{q_i} = \overline{F_2} \quad (2)$$

where $q_i = x_3$ or $x_4$, and where, for the forearm:

$$\overline{F_2} = F_1(t) \quad (3)$$

and the stick:

$$\overline{F_2} = F_2(t) - B_s \dot{x}_3 \quad (4)$$

and $F_1(t)$ and $F_2(t)$ are respectively applied external forces to the forearm and stick, and $B_s$ is the damping coeficient for stick motion. The resulting equations are:

$$\tfrac{1}{4} M_g \ddot{x}_4 + K_I(x_4 - x_3) = F_1(t) \quad (5)$$

$$\tfrac{1}{4} M_g \ddot{x}_3 + K_I(x_3 - x_4) + K_s x_3 = F_2(t) - B_s \dot{x}_3 \quad (6)$$

These equations can be written in state variable form as follows:

(x − y Plane)

$$\begin{bmatrix} \dot{Y}_1 \\ \dot{Y}_2 \\ \dot{Y}_3 \\ \dot{Y}_4 \end{bmatrix} = \begin{bmatrix} 0 & 1 & 0 & 0 \\ 4(K_s + K_I)/M_s & -4B_s/M_s & 4K_I/M_s & 0 \\ 0 & 0 & 0 & 1 \\ 4K_I/M_g & 0 & -4K_I/M_g & 0 \end{bmatrix} \begin{bmatrix} Y_1 \\ Y_2 \\ Y_3 \\ Y_4 \end{bmatrix} + \begin{bmatrix} 0 \\ 4F_2(t)/M_s \\ 0 \\ 4F_1(t)/M_g \end{bmatrix} \quad (7)$$

where the choice of state variables is:

$$Y_1(t) \triangleq \dot{x}_3(t), Y_2(t) \triangleq x_3(t), Y_3(t) \triangleq x_4(t), Y_4(t) \triangleq \dot{x}_4(t).$$

Typical values of the relevant constants in FIGS. 5 and 6 are displayed in Table I. These measurements were made in the vibration theory area and are summarized in (2). The optimization problem of interest can now be formulated such that it is possible to design $K_s$, $B_s$, and $M_s$ to achieve an optimal design.

TABLE I

| Variable Name | Value/Unit | Comments |
| --- | --- | --- |
| $L_1$ | .29 meters | Lower Arm Length |
| $K_I$ | .792 × 10⁴ N./M. | Inverse of Grip Interface Compliance |
| $B_I$ | 1.792 × 10² Sec. | Interface Damping |
| $M_s$ | 0.31 Kg. | Stick Mass "Stiff Stick" |
| $K_F$ | 13,900 N./M. | Stick Gradient, "Stiff Stick" |
| $B_F$ | 2.0 N./M./Sec. | Stick Damper "Stiff Stick" |
| $M_g$ | 1.017 Kg. | Lower Arm Mass |
| $K_s$ | 13,900 N./M. | Stick Gradient |
| $B_s$ | 2.0 N./M./Sec. | Stick Damper |

Formulation of the Optimization Problem:

From FIGS. 5 and 6, the problem of interest is to pick values of $K_s$, $B_s$, and $M_s$ in such a manner as to minimize deflections at $x_3(t)$ due to disturbances from $F_2(t)$ which are a result of a $G_y$ force vector field. It is noted that when the optimal values of $K_s$, $B_s$, and $M_s$ (denoted as $K_s^*$, $B_s^*$, and $M_s^*$) are obtained, these values may differ from the true stick values. The differences:

$$\Delta K_s = K_s^* - K_s \quad (8a)$$

$$\Delta B_s = B_s^* - B_s \quad (8b)$$

$$\Delta M_s = M_s^* - M_s \quad (8c)$$

become the values of the augmented system which must be added to the true stick parameters to improve the total response of the man-machine interaction. This is analogous to the vibration resistant problem in which the augmented system is designed to produce zero amplitude of the mass $M_1$ in FIG. 4. The difficulty problem at this point is in the determination of the criteria of optimality. If is is assumed that $F_2(t)$ can be decomposed into its Fourier components:

$$F_2(t) = \sum_{i=1}^{n} A_i \mathrm{Sin}(\omega_i t + \phi_i) \quad (9)$$

where n is fixed. For small angles, the system is decoupled between the z-x plane and the z-y plane, then equation (7) can be written:

$$\dot{Y}(t) = AY(t) + B \quad (10)$$

where $$A = A(K_s, B_s, M_s) \quad (11)$$

is the only term which depends on the parameters to be optimized. If the definition of optimality is such as to produce minimal amplitude at $x_3(t)$ due to $F_2(t)$, then J may be minimally defined as follows:

$$J(K_s, B_s, M_s) = \frac{1}{\Delta T} \int \Delta T \begin{bmatrix} Y_1(t) \\ Y_2(t) \\ Y_3(t) \\ Y_4(t) \end{bmatrix}^T Q \begin{bmatrix} Y_1(t) \\ Y_2(t) \\ Y_3(t) \\ Y_4(t) \end{bmatrix} dt \quad (12)$$

where $\Delta T$ is the duration of the tracking task, T indicates matrix transpose, and Q is a positive semidefinite matrix. If:

$$Q = \begin{bmatrix} q_1, 0, 0, 0 \\ 0, 0, 0, 0 \\ 0, 0, q_2, 0 \\ 0, 0, 0, 0 \end{bmatrix} \quad q_1 > 0, q_2 > 0, \tag{13}$$

then the optimization problem consists of the minimization of only the measurement variables $\dot{x}_3(t)$ and $\dot{x}_4(t)$. If, however, Q is given by:

$$Q = \begin{bmatrix} q_1, 0, 0, 0 \\ 0, q_2, 0, 0 \\ 0, 0, q_3, 0 \\ 0, 0, 0, z_4 \end{bmatrix} \quad q_1 > 0, i = 1,4, \tag{14}$$

then the cost functional J will include minimization of the variables $x_3(t)$, $\dot{x}_3(t)$, $x_4(t)$ and $\dot{x}_4(t)$. The optimization problem can be summarized as follows:

Minimize $J(K_s, M_s, B_s)$ with respect to the variables $K_s/M_s$, and $B_s/M_s$ subject to equation (12), (10), and $F_2(t)$ specified in equation (9) (assume $M_s$=contant for simplicity).

Solution of the Optimization Problem

The optimization problem specified by J of equation (12) with Y(t) satisfying (10) and $F_2(t)$ satisfying (9) is a problem of the Lagrange type [3]. To solve this problem, the Hamilitonian of the system is defined by:

$$H(t,Y,K_s/M_s,B_s/M_s) = L(t,Y,K_s/M_s,B_s/M_s) + \lambda^T(t)[\dot{Y}(t)] \tag{15}$$

where $\lambda^T(t) = [\lambda_1(t), \lambda_2(t)]$ is the Lagrange multiplier vector. The Euler equations of optimality for an optimal solution are of the form:

$$\dot{Y}(t) = AY(t) + B = f(Y,K_s/M_s,B_s/M_s) \tag{16}$$

$$\dot{\lambda}(t) = -\frac{\partial H}{\partial Y} = -\frac{\partial L}{\partial Y} - \frac{\partial}{\partial Y}[f(Y, K_s/M_s, B_s/M_s)]\lambda(t) \tag{17}$$

The partial derivatives in equation (17) are of the form of matrix partial derivatives [4]; (17) then becomes:

$$\dot{\lambda}(t) = -\frac{\partial}{\partial Y}[(\tfrac{1}{2})Y^T(t)QY(t)] - \frac{\partial}{\partial Y}[AY(t) + B]\lambda(t) \tag{18}$$

or $$\dot{\lambda}(t) = -A^T\lambda(t) - QY(t) \tag{19}$$

and the third equation to be satisfied for optimality is:

$$\frac{\partial}{\partial K} H(Y, K_s/M_s, B_s/M_s) = 0 \tag{20}$$

where $\bar{K}=(K_s/M_s, B_s/M_s)$=the parameters for which the optimization is conducted. If (20) is a linear function of the parameters, (20) is replaced by the condition that $((K_s/M_s)^*, (B_s/M_s)^*)$ be determined such that:

$$H(Y,(K_s/M_s)^*, (B_s/M_s)^*) \leq H(Y,K_s/M_s,B_s/M_s) \tag{21}$$

for all admissible values of $(K_s/M_s)$ and $(B_s/M_s)$. This occurs in the case that some range of values of $(K_s/M_s)$ and $(B_s/M_s)$ are known, e.g.

$$(K_s/M_s)_o \leq K_s/M_s \leq (K_s/M_s)_1 \tag{22a}$$

$$(B_s/M_s)_o \leq B_s/M_s \leq (B_s/M_s)_1 \tag{22b}$$

is the range of allowable values.
Since:

$$H = Y^T(t)QY(t) + \lambda^T(t)[f(Y,K_s/M_s,B_s/M_s)] \tag{23}$$

or $$H = Y^T(t)QY(t) + \lambda^T(t)[A(K_s/M_s,B_s/M_s)Y(t) + B] \tag{24}$$

Then partial derivates of H in equation (24) with respect to $K_s/M_s$ and $B_s/M_s$ would not yield a linear solution for the parameters. This is due to the fact that H is not quadratic in the parameters. Using the relationship (21), the minimization of H must be conducted over a grid of values. This is analogous to final time problems [3] in which the state variables of the λ equation are linear in the variables to be optimized. The three necessary conditions for optimality can now be summarized as follows:

| | | |
|---|---|---|
| Condition (1): | $\dot{Y}(t) = AY(t) + B$ | (25a) |
| | $Y(t_o)$ specified | (25b) |
| Condition (2): | $\dot{\lambda}(t) = -A^T\lambda(t) - QY(t)$ | (26a) |
| | $\lambda(\Delta T) = 0$ (Transversality Condition) | (26b) |
| Condition (3): | Determine $(K_s/M_s)^*, (B_s/M_s)^*$ such that: | (27) |
| | min $H(Y,(K_s/M_s)^*, (B_s/M_s)^*) \leq H(Y,K_s/M_s,B_s/M_s)$ | | for all admissible values of $(K_s/M_s)$ and $(B_s/M_s)$ which fall within a constraint set specified by equations (22a-b). An algorithm to determine the optimal gains can be stated as follows:

The Algorithm

Step 1: Pick an initial value of $(K_s/M_s)_o$ and $(B_s/M_s)_o$.
Step 2: Integrate Y(t) foward using (25a-b).
Step 3: Integrate λ(t) backwards using (26a-b).
Step 4: Evaluate $H_i(K_s/M_s)_i$ for this iteration.
Step 5: Pick a different value of $(K_s/M_s)_{i+1}$ and $(B_s/M_s)_{i+1}$ from the grid of values and go to step 2.
Step 6: Repeat steps 2-5 for a grid of values unit the optimal values $(K_s/M_s)^*$ and $(B_s/M_s)^*$ are obtained such that the relationship (27) is satisfied.

It is noted that a gradient procedure could be used to determine the parameters which minimize H in lieu of a grid approach. For purposes of understanding the problem better, the grid method is chosen based on representative values displayed in Table I.

Figure 8:
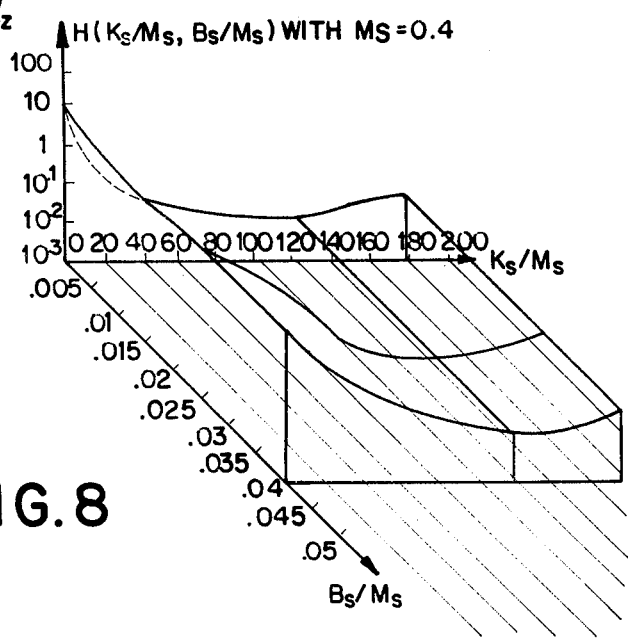
FIG. 8 shows a plot of H versus $K_s/M_s$ versus $B_s/M_s$.

Using a grid method, the variable H (which is a measure of the feedthrough) is plotted for different values of K* and B* (M*=0.4 Kg.=constant) for different constant values in FIG. 8. It is obvious from this diagram that the minimum amount of stick feedthrough occurs for a fixed (and unique) value of K* and B* specified. FIG. 8 was obtained using the typical values of human measurements in Table I with ΔT specified at 100 seconds. Computer Attachment I illustrates the program which gives rise to the plot in FIG. 8.

For the dynamic simulation K*(t) and B*(t) vary with time and the entire algorithm (steps 1-6) must be used. In this case it is required to integrate Y(t) forward in the microprocessor, integrate λ(t) backwards in the microprocessor and to use some type of iteration procedure to update the unknown initial conditions $\lambda(t_o)$. Computer Attachment II illustrates the dynamic program which changes the gain $K^*(t)$ as a function of time and the dashpot value $B^*(t)$ as a function of time. For a dynamic simulation of the same $G_y$ data and constants used in FIG. 8 (the only change was the time varying quantities $K^*(t)$ and $B^*(t)$), the value of H determined from the simulation was: H=0.00268.

The updating procedure used in Computer Attachment II to iterate on the initial conditions $\lambda(t_o)$ was a gradient method based on the principal:

$$\lambda_j(t_o) = \lambda_{j-1}(t_o) + \Delta \text{ where } \Delta = \qquad (28)$$

$$\frac{\partial E}{\partial \lambda_{j-1}(t_o)} \simeq \frac{\partial E}{\partial \lambda_{j-1}(t_f)} \frac{\Delta \lambda_{j-1}(t_f)}{\Delta \lambda_{j-1}(t_o)}$$

Compute this Numerically For Two Successive Iterations $$E = \tfrac{1}{2} \|\lambda(t_f) - \lambda(t_f)\|^2 = \tfrac{1}{2} \|\lambda(t_f)\|^2$$

Figure 9:
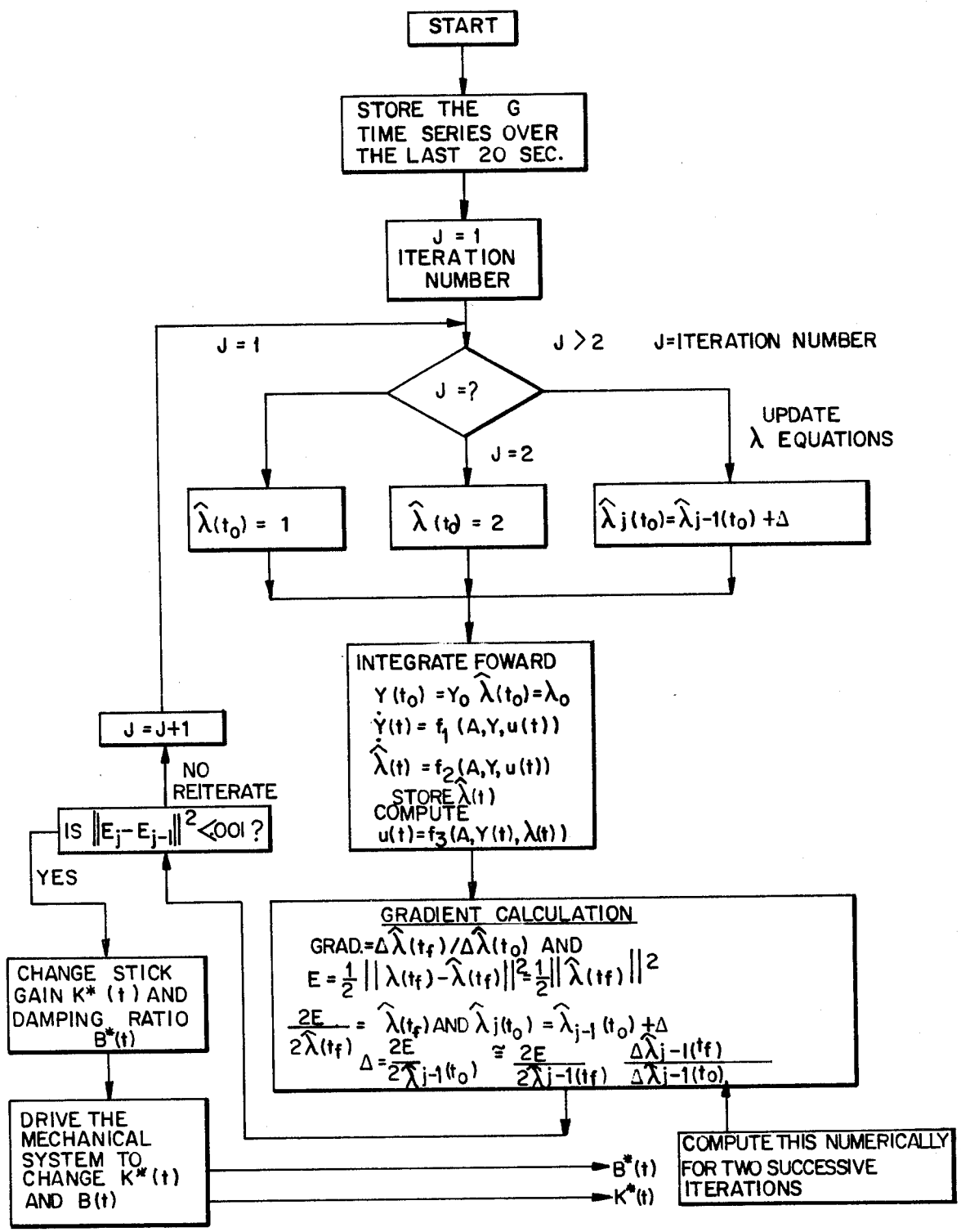
FIG. 9 is a flow diagram of an algorithm which may be used with the invention.

FIG. 9 illustrates a flow chart of the total algorithm used in Computer Attachment II. It should be emphasized that the computer algorithm could be used to change the stick's dynamical characteristics ($K^*(t)$, $B^*(t)$) in any manner desired by simply changing the microprocessor algorithm which can be done quite easily.

REFERENCES

[1] Jex, Henry, R., and Raymond E. Magdaleno, "Biomechanical Models for Vibration Feedthrough to Hands and Head for Semisupine Pilot", *Aviation, Space, and Environmental Medicine*, Vol, 49, No. 1, Sec. II, January, 1978.

[2] Jex, H. R. and R. E. Magdaleno, "Modeling Biodynamic Effects of Vibration", Final Scientific Report No. 1037-1, Systems Technology Inc., August, 1979.

[3] Bryson, A. E. and Y. C. Ho, "Applied Optimal Control", Ginn & Company, 1969.

[4] Athans, M. and F. C. Schweppe, "Gradient Matrices and Matrix Calculations", MIT Lincoln Laboratory, Lexington, Mass., Tech. Note 1965-53, November, 1965.

COMPUTER ATTACHMENT I

Calculations of equation (15) for different values of $K_s$ and $B_s$ constant but specified over a grid of possible values.

```
PROGRAM MAIN(INPUT,OUTPUT,TAPES,TAPE6-OUTPUT)
DIMENSION Y (4,1101), XLAM (r,1101), Z(1101), F2(1101), W(11),
A(11)
DIMENSION PHI(11), XKSMS(10), XBSMS(10),XKS(10)
DIMENSION XH1(10,10), XH2(10,10), XJTF1(10,10, XJTF2(10,10)
DIMENSION H1(1101), H2(1101), XJ1(1101),XJ2(1101)

C*** THIS VERSION FCR XMS=1000
C**  THIS VERSION USES THE OPTIMAL Q AND R VALUES
C*** THIS VERSION THE CONTROLS ARE FIXED
     XMS=1000.
     TF=10.   (TIME SCALED)
C*** FIRST SET UP TIME
     DO 1 I=1,1101
     XI=I
1    Z(I)=(XI-1.)*TF/1100.
C*** NOW SET UP F2(T)
     W(1)=.153
     W(2)=.383
     W(3)=.690
     W(4)=.997
     W(5)=1.457
     W(6)=2.224
     W(7)=3.298
     W(8)=4.755
     W(9)=7.286
     W(10)=10.506
     W(11)=15.67
     A(1)=.370
     A(2)=.340
     A(3)=.288
     A(4)=.251
     A(5)=.195
     A(6)=.121
     A(7)=.119
```

```
      A(8)=.0777
      A(9)=.0124
      A(10)=.00397
      A(11)=.00136
      PHI(1)=.131
      PHI(2)=.079
      PHI(3)=.15
      PHI(4)=.154
      PHI(5)=.196
      PHI(6)=.245
      PHI(7)=.341
      PHI(8)=.574
      PHI(9)=1.322
      PHI(10)=.966
      PHI(11)=1.069
      DO 4 I=1,1101
      F2(I)=0.0
      DO 2 I=1,1101
      DO 3 J=1,11
      DX=A(J)*SIN(W(J)*Z(I)+PHI(J))
3     F2(I)=F2(I)+DX
2     CONTINUE
C**   NOW SET UP THE Q,S
      M=1
      Q1=20.661
      Q2=2.993
      Q3=18.263
      Q4=2.519
        R1=.000010288
        R2=.00103801
        R3=164.609
C **  NOW SET UP THE GRID OF OPTIMAL PARAMETER VALUES
      DO 6 I=1,10
      XI=I
      XKSMS(I)=(XI-1.)*4.
6     XBSMs(I)=(XI-1.)*.0004
      DO 15 I=1,10
15    XKS(I)=XMS*XKSMS(I)
C **  WRITE OUT THE PARAMETER RANGE
      PRINT 7
7     FORMAT (4X,3HI=,10X,5HKS/MS,10X,5HBS/MS,10X,3HXS,/)
      DO 8 I=1,10
8     PRINT 9,I,XKSMS(I),XBSMS(I),XKS(I)
9     FORMAT (4X,I3,5X,F10.3,5X,F10.3,3X,F10.3)
C **  WRITE OUT F2(T)
      PRINT 10
10    FORMAT (//,4X,3HI= ,10X,5HTIME=,10X,6HF2(T)=,/)
      DO 111 I=1,1101
      IF (I-50) 11,11,111
11    PRINT 12,I,Z(I),F2(I)
111   CONTINUE
12    FORMAT (3X,I4,5X,F10.4,5X,F11.4)
5     CONTINUE
C **  NOW FOR THE LOOP
C **  Q IS SET BY THE M VALUE
      DO 14 J=1,10
      DO 14 K=1,10
      YBSMS=XBSMS(J)
      YKSMS=XKSMS(K)
      YKS=XKS(K)
      U1=YKSMS
      U2=17920./XMS
```

```
            U3=YBSMS
            YA=-4.*(YKS+17920.)/XMS
            YB=-4.*YBSMS
            YC=4.*17920/XMS
            YD=70.4318
    C **    FIRST WRITE OUT THE A MATRIX
            YE=0.0
            YF=1.0
            PRINT 16,J,K,XBSMS(J),XKSMS(K),XKS(K)
    16      FORMAT(/,4X,3HJ= ,I2,4X,3HK= ,I2,4X,7HXBS/MS=,F10.3,4X,
            1 7HXKS/MS=,F10.3,4X,4HXKS=,F10.3,/,4x,20HHERE IS THE A MATRIX,/)
            PRINT 17,YE,YF,YE,YE
    17      FORMAT (4X,4(3X,F20.3))
            PRINT 17,YA,YB,YC,YE
            PRINT 17, YE,YE,YE,YF
            PRINT 17,YD,YE,-YD,YE
    C **    NOW INTEGRATE Y(T) FORWARD
            PRINT 100
    100     FORMAT (//,2X,3HI= ,8X,4HDY1=,8X,4HDY2=,8X,4HDY3=,8X,4HDY4=,8X,
            1 1X,3HY1=,9X,3HY2=,9X,3HY3=,9X,3HY4=,/)
            DELT=Z(2)
            DO 16 I=1,4
    18      Y(I,1)=0.0
            DO 19 I=1,1100
            DY1=Y(2,I)
            DY2=YA*Y(1,I)+YB*Y(2,I)+YC*Y(3,I)4.*F2(I)/XMS
            DY3=Y(4,I)
            DY4=YD*Y(1,I)-YD*Y(3,I)+4.*F2(I)/2247.57
            Y(1,I+1)=Y(1,I)+DELT*DY1
            Y(2,I+1)=Y(2,I)+DELT*DY2
            Y(3,I+1)=Y(3,I)+DELT*DY3
            Y(4,I+1)=Y(4,I)+DELT*DY4
            IF (I.50)200,200,201
    200     CONTINUE
            PRINT 101,I,DY1,DY2,DY3,DY4,Y(1,I),Y(2,I),Y(3,I),Y(4,I)
    201     CONTINUE
    101     FORMAT (1X,I4,8(1X,G11.5))
    19      CONTINUE
    C **    IF THE FIRST TIME THROUGH, WRITE OUT Y(T)
            IF(J-1)20,20,21
    20      IF(K-1)22,22,21
    22      PRINT 23
    23      FORMAT (4X,39H FIRST TIME THROUGH,J=1,K=1-HERE IS Y(T),/,4X,
            1 4HTIME,10X,6HY1(T)=,6HY2(T)=,10X,6HY3(T)=,10X,6HY4(T)=,/)
            DO 24 I-1,1101
            IF(I.GT.50. AND.I.LT.1050)GO TO 24
    244     PRINT 25,Z(I),Y(1,I),Y(2,I),Y(3,I),Y(4,I)
    24      CONTINUE
    25      FORMAT (3),F5.2,4(1X,G15.9))
    21      CONTINUE
            Y1MAX=0.0
            Y1MIN=0.0
            Y2MAX=0.0
            Y2MIN=0.0
            Y3MAX=0.0
            Y3MIN=0.0
            Y4MIN=0.0
            Y4MAX=0.0
            DO 413 I=1,1101
            IF(Y(1,I)-Y1MAX)414,414,415
    415     Y1MAX=Y(1,I)
    414     IF(Y1MIN-Y(1,I))416,416,417
    417     Y1MIN=Y(1,I)
```

```
416     IF(Y(2,I)-Y2MAX)437,437,438
438     Y2MAX=Y(2,I)
437     IF(Y2MIN-Y(2,I))419,419,420
420     Y2MIN=Y(2,T)
419     IF(Y(3,I)-Y3MAX)421,421,422
422     Y3MAX=Y(3,I)
421     IF(Y3MIN-Y(3,I))423,423,424
424     Y3MIN=Y(3,I)
423     IF(Y(4,I)-Y4MAX)425,425,426
426     Y4MAX=Y(4,I)
425     IF(Y4MIN-Y(4,I))427,427,428
428     Y4MIN=Y(4,I)
427     CONTINUE
413     PRINT 412,Y1MAX,Y1MIN,Y2MAX,Y2MIN,Y3MAX,Y3MIN,Y4MAX,Y4MIN
412     FORMAT(/,4X,11HMAX VALUES=,/,4X,6HY1MAX=,F6.2,1X,6HY2MIN=,
       1 F6.3,6HY2MAX=,F6.3,1X,6HY2MIN=,F6.3,1X,6HY3MAX=,F6.3,
       2 1X,6HY3MIN=,F6.3,6HY4MAX=,F6.3,1X,6HY4MIN=,F6.3,1X,/)
C **   NOW INTEGRATE LAMBDAS BACKWARDS
        DO 26 I=1,4
26      XLAM(I,1101)=0.0
        DO 27 I=1,1100
        KJ=1101-I
        DL1=-Q1*Y(1,KJ+1)-YD*XLAM(4,KJ+1)-XLAM(2,KJ+1)*(4.*U1+4.*U2)
        DL2=-XLAM(1,KJ+1)+4.*U3*XLAM(2,KJ+1)-Q2*Y(2,KJ+1)
        DL3=-4.*U2*XLAM(2,KJ+1)+YD*XLAM(4,KJ+1)-Q3*Y(3,KJ+1)
        DL4=XLAM(3,KJ+1)-Q4*Y(4,KJ+1)
        XLAM(1,KJ)=XLAM(1,KJ+1)-DELT*DL1
        XLAM(2,KJ)=XLAM(2,KJ+1)-DELT*DL2
        XLAM(3,KJ)=XLAM(3,KJ+1)-DELT*DL3
        XLAM(4,KJ)=XLAM(4,KJ+1)-DELT*DL4
27      CONTINUE
C **   WRITE OUT LAMBDAS FOR J=K=1
        IF(J-1)28,28,29
28      IF(K-1)30,30,29
30      PRINT 31
31      FORMAT (4X,42HFIRST TIME THROUGH, J=1,K=1-HERE IS LAM(T),/,4X,
       1 4HTIME, 9X,7HLAM1(T),9X,7HLAM2(T),9X,7HLAM3(T),9X,7HLAM4(T),/
        DO 32 I=1,1101
        IF(I.GT.100.AND.I.LT.1(00) GO TO 32
322     PRINT 25,Z(I),XLAM(1,I),XLAM(2,I),XLAM(3,I),XLAM(4,I)
32      CONTINUE
29      CONTINUE
C **   NOW COMPUTE THE HAMILTONIAN
        DO 34 I=1,1101
        DY1=Y(2,I)
        DY2=YA*Y(1,I)+YB*Y(2,I)+YC*Y(3,I)+4.*F2(I)/XMS
        DY3=Y(4,I)
        DY4+YD*Y(1,I)-YD*Y(3,I)+4.*F2(I)/2247.57
        H1(I)=Y(1,I)*Q1*Y(1,I)+Y(2,I)*Q2*Y(2,I)+Y(3,I)*Q3*Y(3,I)
       1 +Y(4,I)*Q4*Y(4,I)+XLAM(1,I)*DY1+XLAM(2,I)*DY2+XLAM(3,I)*DY3
       1 +XLAM(4,I)*DY4+U1*R1*U1+U2*R2*U2+U3*R3*U3
        H2(I)=H1(I)-U1*R1*U1-U2*R2*U2-U3*R3*U3
34      CONTINUE
        XH1(J,K)=H1(1101)
        XH2(J,K)=H2(1101)
C **   NOW COMPUTE J(T), THE INTEGRAL
        XJ1(1)=0.0
        XJ2(1)=0.0
        DO 35 I=1,1100
        DJ1=Y(1,I)*Q1*Y(1,I)+Y(2,I)*Q2*Y(2,I)+Y(3,I)*Q3*Y(3,I)
       1 +Y(4,I)*Q4*Y(4,I)-U1*R1*U1+U2*R2*U2+U3*R3*U3
        DJ2=DJ1-U1*R1*U1-U2*R2*U2-U3*R3*U3
        XJ1(I+1)=XJ1(I)+DELT*DJ1
```

```
            XJ2(I+1)=XJ2(I)+DELT*DJ2
35      CONTINUE
        DO 36 I=1,1101
        XJ1(I)=(1./TF)*XJ1(I)
        XJ2(I)=(1./TF)*XJ2(I)
36      CONTINUE
        XJTF1(J,K)=XJ1(1101)
        XJTF2(J,K)=XJ2(1101)
C **    IF FIRST TIME THROUGH, PRINT H AND J
        IF(J-1)37,37,38
37      IF(K-1)39,39,38
38      PRINT 40
40      FORMAT(4X,42HFIRST TIME THROUGH, J=1,K=1-HEREIS H AND J,/4X,
       1 4HTIME,20X,5HH(T)=,20X,5HJ(T)=,/)
        DO 41 I=1,1101
        IF(I.GT.100.AND.I.LT.1000)GO TO 41
411     PRINT 42,Z(I),H1(I),H2(I),XJ1(I),XJ2(I)
41      CONTINUE
42      FORMAT(3X,F5.2,4(1X,G24.18))
38      CONTINUE
C **    NOW WRITE OUT THIS ITERATION
        PRINT 43,J,K,YBSMS,YKSMS,YKS,H1(1101),XJ1(1101)
43      FORMAT(4X,21HEND OF THE ITERAT. ,3HJ= ,I2,3HK= ,I2,1X,7HXBS/MS=
       1 ,F10.3,4X,7HXKS/MS=,F10.3,4X,4HXKS=,F10.3,4X,8HH(TF)=,G10.4,
       1 4X,6HJ(TF)=,G10.4,/)
14      CONTINUE
        PRINT 303,Q1,Q2,Q3,Q4
303     FORMAT(4X,4HQ1= ,F10.3,1X,4HQ2= ,F10.3,1X,4HQ3= ,F10.3,
       1 1X,4HQ4= ,F10.3,/)
        PRINT 301,XMS
301     FORMAT(30X,5HXMS= ,F10.3,/,4X,3HJ= ,5X,3HK= ,5X,
       1 7HXKS/MS=,5X,7HXBS/MS=,5X,4HXKS=,5X,6HH(TF)=,
       1 5X,6HJ(TF)=,/)
        DO 300 J=1,10
        DO 300 K=1,10
        PRINT 302,J,K,XKSMS(K),XBSMS(J),XKS(K),XH1(J,K),XJTF1(J,K)
300     CONTINUE
        DO 3000 J=1,10
        DO 3000 K=1,10
3000    PRINT 302,J,K,XKSMS(K),XBSMS(J),XKS(K),XH2(J,K),XJTF2(J,K)
302     FORMAT(4X,I3,5X,I3,2(1X,F11.3),1X,F8.3,2(1X,G10.4))
        M=M+1
        IF(M-3)44,46,46
44      CONTINUE
        Q1=1.0
        Q2=0.0
        Q3=1.0
        Q4=0.0
        GO TO 5
46      CONTINUE
        END
```

COMPUTER ATTACHMENT II

Calculation of $H(k_s(t), B_s(t))$ for the time varying quantities $K_s(t)$ and $B_s(t)$. The initial conditions $\hat{\lambda}(t_0)$ are iterated in accordance with equation (28).

```
PROGRAM MAIN(INPUT,OUTPUT,TAPE5,TAPE6=OUTPUT)
DIMENSION Y(4,1102,XLAM(4,1102),Z(1101),F2(1101,W(11),A(11)
```

```
      DIMENSION PHI(11)
      DIMENSION H(1101),XJ(1102)
      DIMENSION U1(1101),U2(1101),U3(1101)
      DIMENSION XH(100),XXJ(100)

C ***  THIS VERSION THE CONTROLS ARE TIME VARYING
C ***  THIS VERSION DEL LAM PROP TO DELAM1*(1.0)
       TF=0.1   (TIME SCALED)
C ***  FIRST SET UP TIME
       DO 1 I=1,1101
       XI=I
1      Z(I)=XI-1.)*TF/1100.
       DELT=Z(2)
C ***  NOW SET UP F2(T)
       W(1)=.153
       W(2)=.383
       W(3)=.690
       W(4)=.997
       W(5)=1.457
       W(6)=2.224
       W(7)=3.298
       W(8)=4.755
       W(9)=7.286
       W(10)=10.506
       W(11)=15.57
       A(1)=.370
       A(2)=.340
       A(3)=.288
       A(4)=.251
       A(5)=.195
       A(6)=.121
       A(7)=.119
       A(8)=.0777
       A(9)=.0124
       A(10)=.00397
       A(11)=.00136
       PHI(1)=.131
       PHI(2)=.079
       PHI(3)=.150
       PHI(4)=.154
       PHI(5)=.196
       PHI(6)=.245
       PHI(7)=.341
       PHI(8)=.574
       PHI(9)=1.322
       PHI(10)=.966
       PHI(11)=1.069
       DO 4 I=1,1101
4      F2(I)=0.0
       DO 2 I-1,1101
       DO 3 J=1,11
       DX=A(J)*SIN(W(J)*Z(I)+FHI(J))
3      F2(I)=F2(I)+DX
2      CONTINUE
C **   NOW SET UP THE Q,S
       Q1=10.
       Q2=10.
       Q3=10.
       Q4=10.
       R1=1.
       R2=1.
       R3=1.
```

```
C **     WRITE OUT F2(T)
         PRINT 10
10       FORMAT (//,4X,3HI= ,10X,5HTIME=,10X,6HF2(T)=,/)
         DO 111 T=1,11-1
         IF(I-50) 11,11,111
11       PRINT 12,T,Z(I),F2(T)
111      CONTINUE
12       FORMAT (3X,T4,5X,F10.4,5X,F11,4)
5        CONTINUE
C **     NOW FOR THE LOOP
C **     Q IS SET BY THE M VALUE
         YD=1.
         DO 14 J=1,100
C ***    SET LAMBDA AT TO
         IF(J-1)700,700,701
700      XLAM(1,1)=1.0
         XLAM(2,1)=1.0
         XLAM(3,1)=1.0
         XLAM(4,1)=1.0
         GO TO 702
701      IF(J-2)780,781,780
781      XLAM(1,1)=2.0
         XLAM(2,1)=2.0
         XLAM(3,1)=2.0
         XLAM(4,1)=2.0
780      CONTINUE
702      CONTINUE
         DO 18 I=1,4
18       Y(I,1)=0.0
         U1MAX=0.0
         U2MAX=0.0
         U3MAX-0.0
         U1MIN=0.0
         U2MIN=0.0
         U3MIN=0.0
         Y1MAX=0.0
         Y2MAX=0.0
         Y3MAX=0.0
         Y4MAX=0.0
         Y1MIN=0.0
         Y2MIN=0.0
         Y3MIN=0.0
         Y4MIN=0.0
         XL1MAX=0.0
         XL2MAX=0.0
         XL3MAX=0.0
         XL4MAX=0.0
         XL1MIN=0.0
         XL2MIN=0.0
         XL3MIN=0.0
         XL4MIN=0.0
         DO 19 I=1,1101
         U1(I)=4.*Y(1,I)*XLAM(2,I)/R1
         U2(I)=4.*XLAM(2,I)*F2(I)/(R2*1.)
       1 -4.*XLAM(2,I)*(Y(1,I)+Y(3,I))/R2
         U3(I)=4.*Y(2,I)*XLAM(2,I)/R3
         DY1=Y(2,I)
         DY2=Y(1,I)*4.*(U1(I)+U2(I))-4.*Y(2,I)*U3(I)
       1 +4.*U2(I)*Y(3,I)+4.*F2(I)*U2(I)/1.
         DY3=Y(4,I)
         DY4=YD*Y(1,I)-YD*Y(3,I)+4.*F2(I)/1.
         DL1=-Q1*Y(1,I)-YD*XLAM(4,I)-XLAM(2,I)*4.*(U1(I)+U2(I))
```

```
            DL2=-XLAM(1,I)+4.*XLAM(2,I)*U3(I)-Q2*Y(2,I)
            DL3=-Q3*Y(3,I)+XLAM(4,I)*YD-4.*XLAM(2,I)*U2(I)
            DL4=-XLAM(3,I)-Y(4,I)*Q4
            Y(1,I+1)=Y(1,I)+DELT*DY1
            Y(2,I+1)=Y(2,I)+DELT*DY2
            Y(3,I+1)=Y(3,I)+DELT*DY3
            Y(4,I+1)=Y(4,I)+DELT*DY4
            XLAM(1,I+1)=XLAM(1,I)+DELT*DL1
            XLAM(2,I+1)=XLAM(2,I)+DELT*DL2
            XLAM(3,I+1)=XLAM(3,I)+DELT*DL3
            XLAM(4,I+1)=XLAM(4,I)+DELT*DL4
            IF(U1MAX-U1(I)500,500,501
500         U1MAX=U1(I)
501         IF(U2MAX-U2(I))502,502,503
502         U2MAX=U2(I)
503         IF(U3MAX-U3(I))504,504,505
504         U3MAX=U3(I)
505         IF(Y1MAX-Y(1,I))506,506,507
506         Y1MAX=Y(1,I)
507         IF(Y2MAX-Y(2,I))508,508,509
508         Y2MAX=Y(2,I)
509         IF(Y3MAX-Y(3,I))510,510,511
510         Y3MAX=Y(3,I)
511         IF(Y4MAX-Y(4,I))512,512,513
512         Y4MAX=Y(4,I)
513         IF(XL1MAX-XLAM(1,I))514,514,515
514         XL1MAX=XLAM(1,I)
515         IF(XL2MAX-XLAM(2,I))516,516,517
516         XL2MAX=XLAM(2,I)
517         IF(XL3MAX-XLAM(3,I))518,518,519
518         XL3MAX=XLAM(3,I)
519         IF(XL4MAX-XLAM(4,I))520,520,521
520         XL4MAX=XLAM(4,I)
521         IF(U1(I)-U1MIN)522,522,523
522         U1MIN=U1(I)
523         IF(U2(I)-U2MIN)524,524,525
524         U2MIN=U2(I)
525         IF(U3(I)-U3MIN)526,526,527
526         U3MIN=U3(I)
527         IF(Y(1,I)-Y1MIN)528,528,529
528         Y1MIN=Y(1,I)
529         IF(Y(2,I)-Y2MIN)530,530,531
530         Y2MIN=Y(2,I)
531         IF(Y(3,I)-Y3MIN)532,532,533
532         Y3MIN=Y(3,I)
533         IF(Y(4,I)-Y4MIN)534,534,535
534         Y4MIN=Y(4,I)
535         IF(XLAM(1,I)-XL1MIN)536,536,537
536         XL1MIN=XLAM(1,I)
537         IF(XLAM(2,I)-XL2MIN)538,538,539
538         XL2MIN=XLAM(2,I)
539         IF(XLAM(3,I)-XL3MIN)540,540,541
540         XL3MIN=XLAM(3,I)
541         IF(XLAM(4,I)-XL4MIN)542,542,543
542         XL4MIN=XLAM(4,I)
543         CONTINUE
19          CONTINUE
            PRINT 544,J,U1MAX,U2MAX,U3MAX
544         FORMAT(2X,3HJ= ,I3,2X,6HU1MAX=,F15.5,2X,6HU2MAX=,
```

```
            1 FL5.5,2X,6HU3MAX=,F15.5)
              PRINT 545,U1MIN,U2MIN,U3MIN
545           FORMAT(2X,6HU1MIN=,F15.5,2X,6HU2MIN=,F15.5,2X,
            1 6HU3MIN=,F15.5)
              PRINT 546,Y1MIN,Y2MIN,Y3MIN,Y4MIN
546           FORMAT(2X,6HY2MIN=,F15.5,2X,6HY2MIN=,F15.5,2X,
            1 6HY3MIN=,F15.5,2X,6HY4MIN=,F15.5)
              PRINT 547,Y1MAX,Y2MAX,Y3MAX,Y4MAX
547           FORMAT(2X,6HY1MAX=F15.5,2X,6HY2MAX ,F15.5,2X,
            1 6HY3MAX=,F15.5,2X,6HY4MAX=,F15.5)
              PRINT 548,XL1MIN,XL2MIN,XL3MIN,XL4MIN
548           FORMAT(2X,7HXL1MIN=,F15.5,2X,7HXL2MIN=,F15.5,2X,
            1 7HXL3MIN=,F15.5,2X,7HXL4MIN=,F15.5)
              PRINT 549,XL1MAX,XL2MAX,XL3MAX,XL4MAX
549           FORMAT(2X,7HXL1MAX=,F15.5,2X,7HXL2MAX=,F15.5,2X,
            1 7HXL3MAX=,F15.5,2X,7HXL4MAX=,F15.5)
              IF(J-1)703,703,704
703           XM1TFF=XLAM(1,1101)
              XM2TFF=XLAM(2,1101)
              XM3TFF=XLAM(3,1101)
              XM4TFF=XLAM(4,1101)
              XM1TOF=XLAM(1,1)
              XM2TOF=XLAM(2,1)
              XM3TOF=XLAM(3,1)
              XM4TOF=XLAM(4,1)
              GO TO 709
704           IF(J-2)705,706,706
706           XM1TFL=XLAM(1,1101)
              XM2TFL=XLAM(2,1101)
              XM3TFL=XLAM(3,1101)
              XM4TFL=XLAM(4,1101)
              XM1TOL=XLAM(1,1)
              XM2TOL=XLAM(2,1)
              XM3TOL=XLAM(3,1)
              XM3TOL=XLAM(4,1)
705           CONTINUE
C             CALCULATE DELTA LAM(TF)/DELTA LAM(TO)
              DEL1=XM1TFL-XM1TFF
              DEL2=XM2TFL-XM2TFF
              DEL3=XM3TFL-XM3TFF
              DEL4=XM3TFL-XM4TFF
              DEL5=XM1TOL-XM1TOF
              DEL6=XM2TOL-XM2TOF
              DEL7=XM3TOL-XM3TOF
              DEL8=XM4TOL-XM4TOF
              IF(DEL5)710,711,710
710           D1=DEL1/DEL5
711           IF(DEL6)712,713,712
712           D2=DEL2/DEL6
713           IF(DEL7)714,715,714
714           D3=DEL3/DEL7
715           IF(DEL8)716,717,716
716           D4=DEL4/DEL8
717           CONTINUE
              PRINT 718,J,XM1TFL,XM1TFF,XM2TFL,XM2TFF
            1 XM3TFL,XM3TFF,XM4TFL,XM4TFF
718           FORMAT(2X,17HITERATION NUMBER=,I3,/,2X,10HLAM1(TF)L=,
            1 F15.5,2X,10HLAM1(TF)F=,F15.5,/,2X,10HLAM2(TF)L=,F15.5,2X,
            1 10HLAM2(TF)F=,F15.5,/,2X,10HLAM3(TF)L=,
            1 F15.5,2X,10HLAM3(TF)F=,F15.5,/,2X,10HLAM4(TF)L=,F15.5,2X,
            1 10HLAM4(TF)F=,F15.5)
              PRINT 719,XM1TOL,XM1TOF,XM2TOL,XM2TOF,
            1 XM3TOL,XM3TOF,XM4TOL,XM4TOF
```

```
719     FORMAT(2X,10HLAM1(TO)L=,F.15.5,2X,10HLAM1(TO)F=,F15.5,/,2X,
       1 10HLAM2(TO)L=,F15.5,2X,10HLAM2(TO)F=,F15.5,/,2X,
       1 10HLAM3(TO)L=,F15.5,2X,10HLAM3(TO)F=,F15.5,/,2X,
       1 L0HLAM4(TO)L=,F15.5,2X,10HLAM4(TO)F=,F15.5 )
C       COMUPTE E
        E1=(XM1TFL)**2
        E2=(XM2TFL)**2
        E3=(XM3TFL)**2
        E4=(XM4TFL)**2
        PRINT 720,E1,E2,E3,E4
720     FORMAT(/,2X,3HE1=,F15.3,2X,3HE2=,F15.3,2X,3HE3=,F15.3,
       1 2X,3HE4=,F15.3)
C       COMPUTE UPDATES ON LAMBDA (TO)
        DELAM1=-XM1TFL*D1
        DELAM2=-XM2TFL*D2
        DELAM3=-XM4TFL*D3
        DELAM4=-XM4TFL*D4
        PRINT 721,DELAM1,DELAM2,DELAM3,DELAM4
        XM1TFF=XLAM(1,1101)
        XM2TFF=XLAM(2,1101)
        XM3TFF=XLAM(3,1101)
        XM4TFF=XLAM(4,1101)
        XM1TOF=XLAM(1,1)
        XM2TOF=XLAM(2,1)
        XM3TOF=XLAM(3,1)
        XM4TOF=XLAM(4,1)
        XLAM(1,1)=XLAM(1,1)+DELAM1*.01
        XLAM(2,1)=XLAM(2,1)+DELAM2*.01
        XLAM(3,1)=XLAM(3,1)+DELAM3*.01
        XLAM(4,1)=XLAM(4,1)+DELAM4*.01
721     FORMAT(/,2X,7HDELAM1=,F15.3,2X,7HDELAM2=,F15.3,2X,
       1 7HDELAM3=,F15.3,2X,7HDELAM4=,F15.3)
        ET=E1+E2+E3+E4
722     PRINT 724,ET
724     FORMAT(2X,3HET=,F15.5,/)
709     CONTINUE
C ****  COMPUTE H AND J
        XJ(1)=0.0
        DO 600 I=1,1101
        DY1=Y(2,I)
        DY2=Y(1,I)*4.*(U1(I)+U2(I))-.4*Y(2,I)*U3(I)
       1 +4.*U2(I)*Y(3,I)+4.*F2(I)*U2(I)/1.
        DY3=Y(4,I)
        DY4=YD*Y(1,I)-YD*Y(3,I)+4.*F2(I)/1.
        H(I)=Y(1,I)*Q1*Y(1,I)+Y(2,I)*Q2*Y(2,I)+Y(3,I)*Q3*Y(3,I)
       1 +Y(4,I)*Q4*Y(4,I)+U1(I)*R1*U1(I)+U2(I)*R2*U2(I)
       1 +U3(I)*R3*U3(I)+XLAM(1,I)*DY1+XLAM(2,I)*DY2
       1 +XLAM(3,I)*DY3+XLAM(4,I)*DY4
        DJ=(1,I)*Q1*Y(1,I)+Y(2,I)*Q2*Y(2,I)+Y(3,I)*Q3*Y(3,I)
       1 +Y(4,I)*Q4*Y(4,I)+U1(I)*R*U1(I)+U2(I)*R2*U2(I)+U3(I)*R3*U3(I
600     XJ(I+1)=XJ(I)+DELT*DJ
        XH(J)=H(1101)
        XXJ(J)=XJ(1101)
        PRINT 601,J,XH(J),XXJ(J)
601     FORMAT(.,2X,17HITERATION NUMBER=,I3,2X,3HH= ,F15.3,2X,
       1 3HJ= ,F15.3)
14      CONTINUE
        DO 602 I=1,100
602     PRINT 601,I,XH(I)XXJ(I)
        END
```

What is claimed is:

1. An aircraft control system which comprises:
   (a) a pilot operable member pivotally connected to the aircraft and adapted so that movement thereof causes deflection of control surfaces of the aircraft;
   (b) a force sensor connected to the aircraft for generating a force signal proportional to a given force acting on the aircraft;
   (c) a processor embodying an algorithm capable of translating said force signal representing said given force acting on said aircraft into a processed signal representing a resistant force correlated with a particular biodynamic force generated by the aircraft pilot's arm on said pilot operable member due to said given force on said aircraft, said processor, upon receiving said force signal from said force sensor, being capable of performing said translation and generating said processed signal;
   (d) resilient means connected to the aircraft and to said pilot operable member; and
   (e) an actuator connected to the aircraft and to said pilot operable member by said resilient means, said actuator being capable of receiving said processed signal and, in response to said signal, of adjusting said resilient means so as to impose said resistant force upon said pilot operable member and null out said biodynamic force acting on said member induced by the action of said given force on the aircraft, as exerted through the arm of the aircraft pilot.

2. The control system of claim 1 which further includes a damper connected to the aircraft and to said pilot operable member.

3. The system of claim 2 wherein said damper has a variable damping coefficient, and wherein said processor is adapted to produce a damping signal, said damper being adapted to receive said damping signal and to vary its damping coefficient in response to said damping signal.

4. The control system of claim 1 wherein said resilient means is connected to said pilot operable member at its midpoint and wherein said actuator is connected to said resilient means, at its opposite ends, thereby permitting said actuator to vary the resistant force of said resilient means causing the pilot operable member to resist the biodynamic force.

5. The control system of claim 4 wherein said resilient means is a spring and said resilient force is determined by a spring constant setting of said spring as adjusted by said actuator.

* * * * *

UNITED STATES PATENT AND TRADEMARK OFFICE
CERTIFICATE OF CORRECTION

PATENT NO. : 4,477,043

DATED : Oct 16, 1984

INVENTOR(S) : Daniel W. Repperger

It is certified that error appears in the above-identified patent and that said Letters Patent is hereby corrected as shown below:

Col 7, line 15 (Equation(1)) should read

---$L = \frac{1}{8}M_g \dot{x}_4^2 + \frac{1}{8}M_s \dot{x}_3^2 + \frac{1}{2}K_I(x_4-x_3)^2 + \frac{1}{2}K_s x_3^2$---

Col 7, line 25, (in Equation (2)), "$\frac{\cdot}{F_2}$" should be ---$\bar{F}_2$---

Col 7, line 38, "coeficient" should be ---coefficient---

Col 7, line 41 (in Equation(6)), "$M_g$" should be ---$M_s$---

Col 7, line 61, "$\dot{x}_3(t)$" should be ---$x_3(t)$---;

"$x_3(t)$" should be ---$\dot{x}_3(t)$---;

"$X_4(t)$" should be ---$x_4(t)$---

Col 7, line 66, "(2)" should be ---[2]---

Col 8, line 60 (Equation(12)) should read

---$$J(K_s, B_s, M_s,) = \frac{1}{\Delta T} \int_0^{\Delta T} \begin{bmatrix} Y_1(t) \\ Y_2(t) \\ Y_3(t) \\ Y_4(t) \end{bmatrix}^T Q \begin{bmatrix} Y_1(t) \\ Y_2(t) \\ Y_3(t) \\ Y_4(t) \end{bmatrix} dt$$---

Col 9, line 5 (in Equation(13)), insert a comma (,) between the second bracket (]) and "$q_1$".

Col 9, line 15 (in Equation(14)), insert a comma (,) between the second bracket (]) and "$q_1$".

UNITED STATES PATENT AND TRADEMARK OFFICE
CERTIFICATE OF CORRECTION

PATENT NO. : 4,477,043

DATED : Oct 16, 1984

INVENTOR(S) : Daniel W. Repperger

It is certified that error appears in the above-identified patent and that said Letters Patent is hereby corrected as shown below:

Col 9, line 18, "$x_3(t)$" second occurrence should be ---$\dot{x}_3(t)$--- and "$x_4(t)$" second occurrence should be ---$\dot{x}_4(t)$---.

Col 9, line 30 (in Equation(15)), "$\dot{y}(t)$" should be ---$\dot{Y}(t)$---.

Col 9, line 33, the minus sign (-) should be an equal sign (=).

Col 9, line 56 (in Equation(20)), "$\frac{\partial}{\partial K}$" should be --- $\frac{\partial}{\partial \bar{K}}$ ---

Col 10, line 43, "$H_i(K_s/M_s)_i)$" should be ---$H_i(Y,(K_s/M_s)_i, (B_s/M_s)_i)$ Col 11, lines 12-15 (in Equation(28)), "$\lambda$" each occurrence should be ---$\hat{\lambda}$---

Signed and Sealed this

Seventeenth Day of September 1985

[SEAL]

Attest:

*Attesting Officer*

DONALD J. QUIGG

*Commissioner of Patents and Trademarks—Designate*